United States Patent
Shokri et al.

(10) Patent No.: US 9,845,396 B2
(45) Date of Patent: Dec. 19, 2017

(54) METHODS FOR MAKING STATIC DISSIPATIVE COATINGS

(71) Applicant: The Boeing Company, Seal Beach, CA (US)

(72) Inventors: Shahnaz Shokri, Bellevue, WA (US); Bruce A. Hooke, Snoqualmie Pass, WA (US); Quynhgiao Le, Bellvue, WA (US)

(73) Assignee: THE BOEING COMPANY, Chicago, IL (US)

( * ) Notice: Subject to any disclaimer, the term of this patent is extended or adjusted under 35 U.S.C. 154(b) by 428 days.

(21) Appl. No.: 13/964,606

(22) Filed: Aug. 12, 2013

(65) Prior Publication Data
US 2015/0041728 A1 Feb. 12, 2015

(51) Int. Cl.
| | |
|---|---|
| *B32B 5/16* | (2006.01) |
| *C09D 5/24* | (2006.01) |
| *C09D 5/00* | (2006.01) |
| *C09D 7/12* | (2006.01) |
| *C08K 3/04* | (2006.01) |

(52) U.S. Cl.
CPC ............. *C09D 5/24* (2013.01); *C09D 5/00* (2013.01); *C09D 7/1216* (2013.01); *C08K 3/041* (2017.05)

(58) Field of Classification Search
CPC ............... C09D 1/00; C09D 5/00; C09D 5/24
USPC ...................................... 428/323; 427/407.1
See application file for complete search history.

(56) References Cited

U.S. PATENT DOCUMENTS

| | | | | |
|---|---|---|---|---|
| 7,118,693 | B2 * | 10/2006 | Glatkowski | B82Y 10/00 174/546 |
| 7,588,699 | B2 * | 9/2009 | Park | B82Y 10/00 252/500 |
| 2003/0122111 | A1 * | 7/2003 | Glatkowski | B82Y 10/00 252/500 |
| 2007/0292622 | A1 * | 12/2007 | Rowley | B82Y 10/00 427/407.1 |
| 2008/0286559 | A1 * | 11/2008 | Lee | C08K 3/04 428/323 |
| 2010/0136256 | A1 | 6/2010 | Hwang et al. | |

FOREIGN PATENT DOCUMENTS

CN 1664035 A * 9/2005 ........... C09D 163/00

OTHER PUBLICATIONS

Erik T. Thostenson and Tsu-Wei Chou, "Aligned multi-walled carbon nanotube-reinforced composites: processing and mechanical characterization," J. Phys. D: Appl. Phys. 35 (2002), pp. 77-80.
International Search Report and Written Opinion dated Sep. 15, 2014 for PCT/US2014/042052, 11 pages.

* cited by examiner

*Primary Examiner* — Khanh Tuan Nguyen
(74) *Attorney, Agent, or Firm* — Coats & Bennett, PLLC

(57) ABSTRACT

The present disclosure relates generally to the field of static dissipative coatings. More specifically, the present disclosure relates to the methods of making static dissipative, preferably non-chromium-containing, coatings comprising carbon nanotubes, the coatings themselves, and structures comprising such coatings.

5 Claims, 1 Drawing Sheet

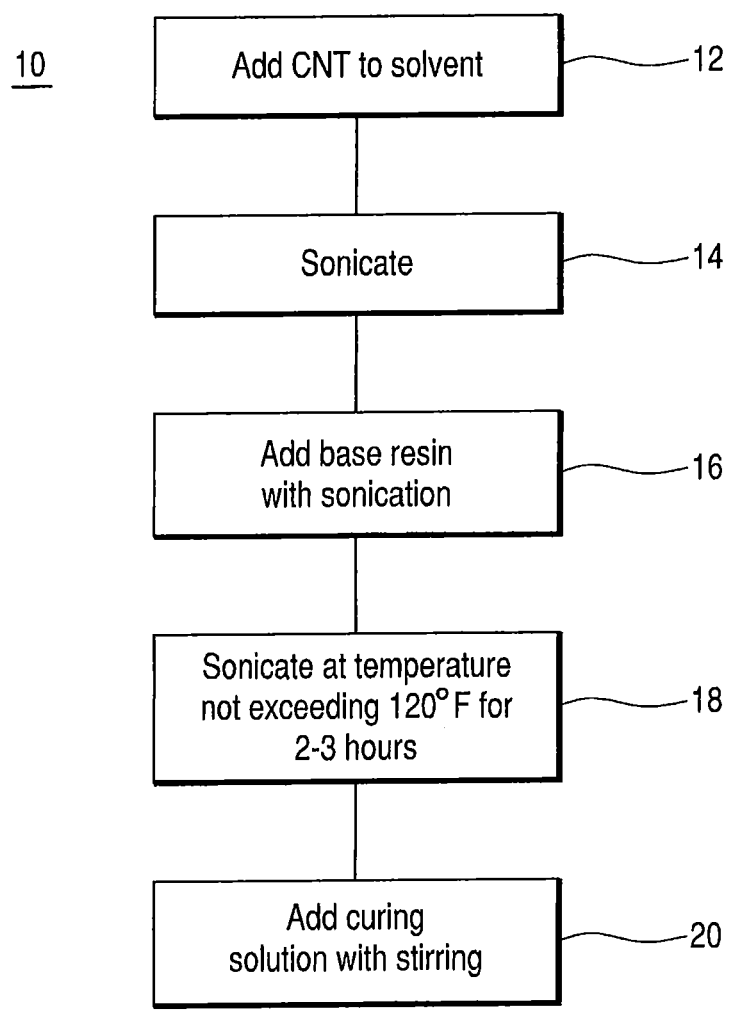

METHODS FOR MAKING STATIC DISSIPATIVE COATINGS

TECHNOLOGICAL FIELD

The present disclosure relates generally to the field of static dissipative coatings. More specifically, the present disclosure relates to the use of static dissipative non-chrome-containing coatings comprising carbon nanotubes.

BACKGROUND

In the field of aeronautics, it is important to predictably and effectively dissipate static and other incidental electrical charges away from critical aircraft and vehicular components, including electronics, fuel tanks, etc. These components are typically coated with paints that can provide a number of important functions, such as, for example, protection from corrosion and other forms of environmental degradation, overcoat or sealant adhesion, abrasion resistance, appearance, etc. The paint coatings are often electrically insulative, resulting in an impediment to the dissipation of static and other electrical charges. The need for static dissipation is increasingly important as aircraft manufacture continues to incorporate non-metallic materials (such as composites, plastics, etc.) that do not dissipate static charges predictably across their surfaces.

Conductive coatings for such non-metallic materials to dissipate static charges have been tried with varying success. However, the known conductive coatings must be loaded with conductive particles to such an extent (sometimes as much as 50-70 weight percent) that other required coating characteristics suffer.

BRIEF SUMMARY

The present disclosure relates to static dissipative coatings, particularly useful in aerospace applications, such as, for example, aircraft fuel tank coatings. Such coatings must satisfy environmental regulations, while achieving desirable properties such as adequate resistivity, corrosion protection, etc.

According to one variation, the present disclosure contemplates making a non-chrome-containing static dissipative coating comprising the steps of preparing a solution comprising carbon nanotubes and a non-polar solvent, sonicating the solution, adding an amount of base resin to the solution to form a mixture while, preferably concurrently, sonicating the mixture, and maintaining the mixture at a temperature below 120° F. According to one variation, prior to use, a curing agent is added to the mixture with stirring. The non-polar solvent can be any useful non-polar solvent that is compatible with the selected base resin.

The carbon nanotubes are preferably multi-walled carbon nanotubes having a preferred dimension of from about 6 to about 9 nm in width, and a length of about 5 μm. The carbon nanotubes are added to the solvent in an amount of from about 0.1 to about 1.0 weight percent, and preferably from about 0.2 to about 0.4 weight percent. The weight percent of carbon nanotubes (CNTs) selected depends only on the other desired coating characteristics, as well as the desired level of resistivity to be imparted by the coating. Nevertheless, the very low concentration (weight percent) of carbon nanotubes introduced into the coating mixture provides the required conductivity, and represents a significant departure from known coatings.

According to one variation, a curing agent can be added up to two weeks or more after preparing the coating mixture. This is due to the superior dispersion of the CNTs in the present formulations according to the disclosed methods. The ability to prepare coatings having dispersed CNTs allows a manufacturer and end user to pre-disperse the CNTs, and obviate known mixing/dispersing issues. Preferred curing agents include, for example, polyfunctional amine-containing compounds for epoxy-based systems and diisocyante-containing compounds for polyurethane-based systems. According to a further variation, the present disclosure is directed to coatings made according the method set forth immediately above.

According to a still further variation, the present disclosure relates to static dissipative coatings comprising an amount of carbon nanotubes, an amount of solvent, an amount of resin and an amount of curing agent. The carbon nanotubes are added in an amount of from about 0.1 to about 1 weight percent, and preferably in an amount of about 0.2 to about 0.4 weight percent. The solvent is preferably a non-polar solvent compatible with the selected base resin. According to one preferred variation, an epoxy resin is used with tert-butyl acetate as the solvent.

The resin may be selected from chromated and non-chromated resins, but non-chromated resins are preferred, including aerospace non-chrome-containing primers possessing superior fuel resistance, corrosion resistance and adhesion. Particularly preferred resins include epoxies, polyurethanes, and combinations thereof.

Preferably, the coating is sprayable onto a surface, and has a preferred resistivity of from about $10^5$ to about $10^9$ ohms/square.

According to still further variations, the present disclosure contemplates a substrate surface comprising the coatings set forth above, including fuel tanks, and substrates including aircraft components and surfaces, vehicle components and surfaces and stationary structure surfaces.

BRIEF DESCRIPTION OF THE DRAWINGS

Having thus described variations of the disclosure in general terms, reference will now be made to the accompanying drawing, which is not necessarily drawn to scale, and wherein:

FIG. 1 is a flowchart of a preferred method of making static dissipative non-chrome-containing coatings comprising carbon nanotubes.

DETAILED DESCRIPTION

According to a variation, the present disclosure contemplates a method for preparing a conductive, static dissipative coating. FIG. 1 shows a flow diagram for a preferred method 10 where an amount of carbon nanotubes (CNT) are added to an amount of solvent 12. The mixture is sonicated 14, followed by adding an amount of base resin 16. The mixture is again sonicated 18 for a period up to 1 to 3 hours at a temperature not to exceed 120° F. The mixture obtained after sonication 18 may be shelved until the desired use, at which point a curing agent is added with stirring 20.

Sonication is understood to be the process by which sound waves propagate into a liquid media resulting in alternating high-pressure (compression) and low-pressure (rarefaction) cycles. During rarefaction, high-intensity sonic waves create small vacuum bubbles or voids in the liquid, which then collapse violently (cavitation) during compression. Ultrasonication is understood here to be occurring at greater than about 20 kHz, resulting in agitation. Double-ultrasonication involves immersing multiple (typically two) sonication probes in a liquid media to perform the ultrasonication. It is understood that the mixing of components in solution according to the methods of the present disclosure, including the CNTs in solution, are sonicated to keep the CNTs in a desired orientation and from agglomerating in the mixture.

The following Examples describe variations of the present disclosure.

Example 1

A carbon nanotube (CNT) in a solvent solution was made by combining 0.53 grams of multi-walled carbon nanotube (MWCNT) powder (Sigma-Aldrich, St Louis, Product Number 724769) with 74.78 grams of tert-butyl acetate solvent. The MWCNTs used were specified to be >95% carbon with an outer diameter of 6-9 nm, and a length of 5 µm. This solution comprised CNTs in an amount of 0.2 weight percent. A horn sonicator (Model W-385—Heat Systems-Ultrasonics, Inc.) was immediately placed into the solution and set to 4-6% output power. The solution was sonicated for 30 minutes with occasional stirring by moving the cup in a rotational motion to achieve substantially uniform sonication. An amount of 120 grams of an epoxy resin primer was added to the solution during sonication. The solution was stirred with a stir bar and then sonicated at a 4-6% output power setting for 2 hours and 8 minutes with occasional movement of the solution container to achieve substantially uniform sonication. At the time of 20 to 60 minutes after the addition of the base resin primer, the solution mixture was placed on an ice bath to maintain the temperature below 120° F. Sonication was stopped after 2 hours and 38 minutes. An amount of 73.35 grams of curing agent, typically a polyfunctional amine was added to the mixture with stirring for 10 minutes. The mixture was loaded into a sprayer (Binks Spray cup gun). The mixture was sprayed as a primer onto a non-conductive aluminum substrate surface, and the resulting film was cured at ambient conditions. Conductivity measurements were taken at 3 days and paint performance tests were conducted at 7 days. Surface resistivity and volume resistivity of the film were measured using a ProStat PRS-801 resistance meter with the ProStat PRF-911 concentric ring using the constant voltage of 10V and 100V. Different locations were measured on the same panel with values recorded. Surface resistivity for the aluminum coated panels were 3.8E05 Ohms/square. Semi-conductive panels were measured at 2.5E9 Ohms/square. Coated glass samples were measured at 1.9E11 Ohms/square.

Example 2

A carbon nanotube (CNT) in solvent solution was made by combining 0.40 grams of untreated multi-walled carbon nanotube (MWCNT) powder (Sigma-Aldrich, St Louis, Product Number 724769) with 78.27 grams of p-xylene solvent. The MWCNTs used were specified to be >95% carbon with an outer diameter of 6-9 nm, and a length of 5 µm. This solution comprised CNTs in an amount of 0.18 weight percent. A horn sonicator (W-385, from Heat Systems-Ultrasonics, Inc.) was immediately placed into the solution and set to 4-6% output power. The solution was sonicated for 30 minutes with occasional stirring by moving the cup in a rotational motion to achieve substantially uniform sonication. An amount of 88.59 grams of non-chrome epoxy primer (a bisphenol-A-diglycidyl ether) was added to the solution during sonication. The solution was stirred in with a stir bar until the solution became uniform in color. At the time of 20 to 60 minutes after the addition of the base resin primer, the solution mixture was placed on an ice bath to maintain the temperature below 120° F. Sonication was stopped after 2 hours and 27 minutes. An amount of 55.48 grams of curing agent (a polyfunctional amine) was added to the mixture with stirring for 10 minutes. The mixture was loaded into a sprayer Binks Spray cup gun. The mixture was sprayed as a primer onto the non-conductive; semi-conductive and highly-conductive substrate surfaces and the resulting films were cured at 70° F.-75° F. and 30% relative humidity for 3-7 days. Surface resistivity and volume resistivity of the film were measured using a ProStat PRS-801 resistance meter with the ProStat PRF-911 concentric ring using the constant voltage of 10V and 100V. Different locations were measured on the same panel with average values recorded at 3.4E10 Ohm for static dissipative primer on non-conductive substrate; 1E8 Ohm for static dissipative primer on semi conductive substrate and 6.6E4 Ohm for static dissipative primer on highly conductive substrate.

The Examples above discusses the use of glass fiber reinforced plastic material systems useful on aircraft components (including spacecraft components), vehicle components and stationary structure components requiring protection from static energy build-up. However, the apparatuses, systems and methods set forth herein are further contemplated for use with manned or unmanned vehicle components or objects of any type or in any field of operation in a terrestrial and/or non-terrestrial and/or marine or submarine setting. A non-exhaustive list of contemplated vehicles include manned and unmanned aircraft, spacecraft, satellites, terrestrial, non-terrestrial vehicles, and surface and sub-surface water-borne vehicles, etc.

While the preferred variations and alternatives of the present disclosure have been illustrated and described, it will be appreciated that various changes and substitutions can be made therein without departing from the spirit and scope of the disclosure. When introducing elements of the present invention or exemplary aspects or embodiment(s) thereof, the articles "a," "an," "the" and "said" are intended to mean that there are one or more of the elements. The terms "comprising," "including" and "having" are intended to be inclusive and mean that there may be additional elements other than the listed elements. Although this invention has been described with respect to specific embodiments, the details of these embodiments are not to be construed as limitations.

We claim:

1. A method for making a mixture for use in making a static dissipative coating comprising the steps of:
    preparing a solution, said solution consisting essentially of multi-walled carbon nanotubes and tert-butyl acetate, said multi-walled carbon nanotubes having a diameter of from about 6 to about 9 nm;
    sonicating the solution a first time;
    adding an epoxy resin to the solution to form a mixture while
    sonicating the mixture a second time; and
    maintaining the mixture at a temperature below 120° F.;
    wherein the mixture maintains the multi-walled carbon nanotubes in a dispersion for at least two weeks.

2. The method of claim 1, after the step maintaining the mixture at a temperature below 120° F., further comprising the step of;
    adding a curing agent to the mixture with stirring;

applying the mixture to a substrate; and curing the mixture to form a coating on the substrate;

wherein the coating has a resistivity of from about $5 \times 10^5$ to about $5 \times 10^9$ ohm/square.

3. The method of claim 1, wherein the multi-walled carbon nanotubes are added to the solvent in an amount of from about 0.1 to about 1.0 weight percent.

4. The method of claim 3, wherein the multi-walled carbon nanotubes are added to the solvent in an amount of from about 0.2 weight percent to about 0.4 weight percent.

5. A method for applying a static dissipative coating to a substrate comprising the steps of:

applying a mixture to the substrate to form the static dissipative coating on the substrate, said mixture comprising a solution, said solution consisting essentially of multi-walled carbon nanotubes and tert-butyl acetate, said multi-walled carbon nanotubes having a diameter of from about 6 to about 9 nm, an epoxy resin, and a curing agent; and wherein the coating has a resistivity of from about $5 \times 10^5$ to about $5 \times 10^9$ ohm/square.

\* \* \* \* \*